Figure 2:
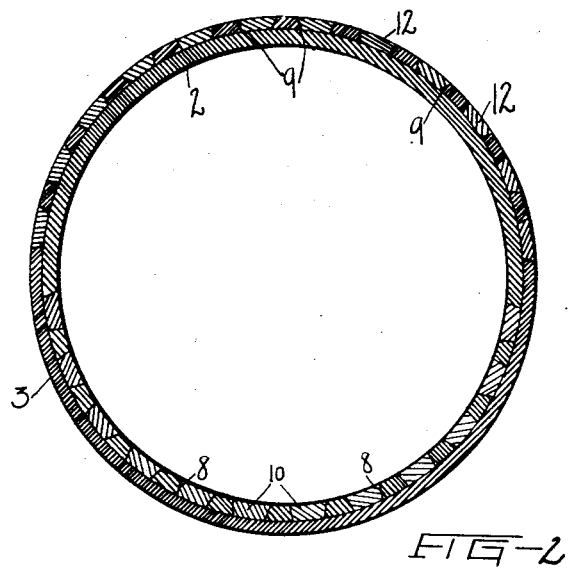

Jan. 8, 1929.

H. A. STRINGFELLOW 1,698,034

PIPE JOINT AND METHOD OF MAKING THE SAME

Filed March 26, 1927

INVENTOR.
HENRY A. STRINGFELLOW

BY Ely & Barrow

ATTORNEYS

Patented Jan. 8, 1929.

1,698,034

UNITED STATES PATENT OFFICE.

HENRY A. STRINGFELLOW, OF AKRON, OHIO, ASSIGNOR TO THE BIGGS BOILER WORKS COMPANY, OF AKRON, OHIO, A CORPORATION OF OHIO.

PIPE JOINT AND METHOD OF MAKING THE SAME.

Application filed March 26, 1927. Serial No. 178,599.

This invention relates to a new and improved form of joint or connection for pipes and particularly to a welded, leak-proof joint, which is adaptable for installation in the field. The object of the invention is to improve upon former joints of this character so as to make it practical to secure a satisfactory joint while the pipe sections are being laid with a minimum of expense.

It is also an object of the invention to so construct and design the pipe joint that it can be easily perfected without danger or injury to the workmen and without possible loss and waste due to faulty construction. With the usual form of connection for the pipe ends the results have not been uniformly satisfactory from a standpoint of economy and efficiency and it is the purpose of the present invention to devise a form of pipe connection which will obviate the difficulties experienced heretofore.

In the drawings, the preferred or best known embodiment of the invention is shown, but it will be appreciated that, having explained the invention in such manner that it may be practised by those skilled in the art, changes, modifications or improvements may be suggested which fall within the scope of the invention, and with a fair interpretation of the claims in the light of the prior art.

Figure 1:
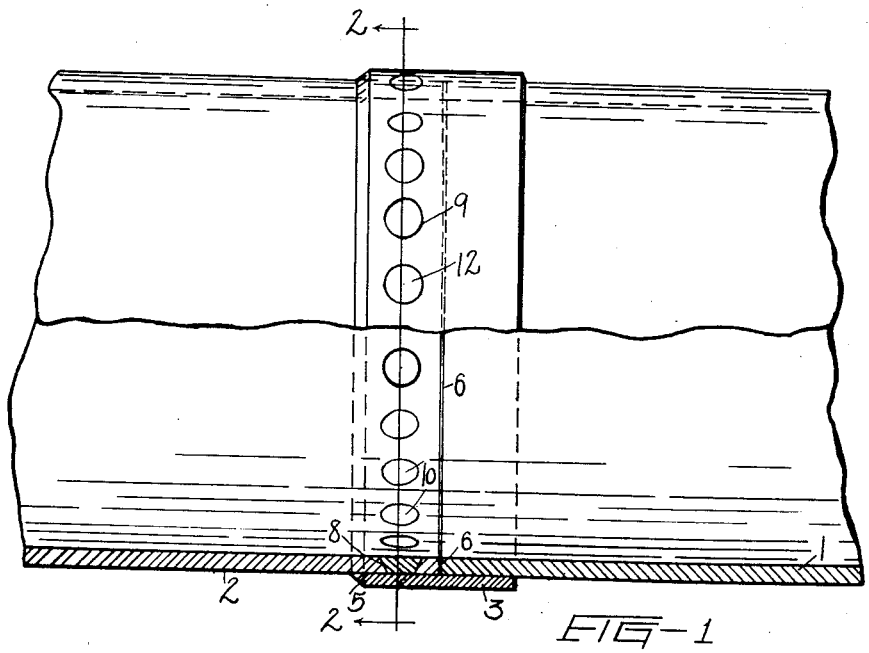

In the drawings:

Figure 1 is a side elevation of a pipe joint made by the process and embodying the features of the invention, the lower portions of the pipe being shown in section; and Figure 2 is a cross section on the line 2—2 of Figure 1.

Two abutting ends of pipes or pipe lengths are indicated at 1 and 2. These pipes may be of any size or shape, but to practise the invention in the preferred or best known manner, the pipe should be large enough to admit a workman inside thereof. The pipes are laid at the location, usually in a trench. To one end of each pipe, here shown as the pipe 1, is welded or otherwise securely fastened a permanent flange in the form of a butt strap 3, the connection of the butt strap to one end of the pipe being done at the factory or in the shop before the pipe is delivered to its location. It is conceivable that the butt strap may be made as an integral part of the pipe.

The butt strap projects beyond the end of the pipe, preferably to the same distance at either side thereof, and is formed on its outer edge with a beveled or conical surface 5 which permits caulking about the edge 5 after the pipe is riveted or welded together by the principal or primary welding operation. The abutting ends of the pipes 1 and 2 may be connected by a caulking weld 6.

About the lower semi-circumference of the pipe 2 which may be designated as the entering pipe, or the male member of the joint, are formed a plurality of recesses or rivet openings 8, and about the upper semi-circumference of the band 3 or female member or receiving member of the joint are formed a plurality of similarly spaced and located recesses or rivet openings 9. When the pipe ends are assembled the respective series of openings are closed on their lower sides by the other member of the pipe coupling.

When the joint is to be made the pipe 1 is a part of the permanent line or is already installed in position, usually in the ditch or trench. The pipe end 2 is then inserted within the strap or butt end of the pipe 1 and the caulking joint 6 is completed. The holes 8 are now filled up by the welds or rivets 10, the operator working from the inside of the pipe. The form of connection is known in the trade as an "electric rivet", it being understood that this is a welded connection in which the openings 8 are filled with metal fused and welded to the adjacent pipe surfaces by an electric arc. As the lower half of the pipe is welded in this manner from within the pipe, the welding operation is downwardly and can, therefore, be closely observed and inspected by the workman, and at the same time there is no danger of the molten metal dropping out of the opening. After the rivets are completely installed the workman may finish or dress the rivets.

The upper half of the rivets, indicated by the numeral 12 lying in the base at the top of the pipe are then riveted or welded in the same manner, the workman in this case operating from above the pipe and the operations of welding and the results being watched in the same manner. If will be observed that by the division of the riveting between the inner and outer surfaces of the pipe in the manner described, the entire riveting process takes place downwardly and none takes place overhead, with the beneficial results indicated and this entire operation may be performd without enlarging the trench about the joint as was necessary with former methods.

In order to insure a perfect joint, or to repair leaks or defects arising after the welding operations described, the pipe joint may be subsequently welded or caulked about the edge 5. This operation, however, is not necessary at all times, but may be used as a precautionary or repair expedient. It is the intention to rely upon the welding through the holes and the spacing and pitch of the "rivets" for the strength in design. The location and design of the rivets may be modified or changed depending upon the thickness of the plates and the pressure to be withstood. The holes 8 and 9 are preferably countersunk to facilitate the welding operation. The caulking weld 6 is relied upon for water-tightness only.

The operation and advantages of the invention will be readily appreciated. No welding operation takes place overhead and it is not necessary to rotate the pipes. In fact, rotation of the pipes would be impracticable where a long conduit is being laid or where the pipes are laid in situ. Both pipes may be connected to the butt strap in the manner described but the already welded butt strap is preferable for obvious reasons. In repairing a joint of this form it is not necessary to disturb any portion of the welding or to de-water the pipes.

What is claimed is:

1. The method of joining pipes comprising bringing two pipe ends into horizontal alignment with the end of one pipe lying within the other pipe end, providing openings in the lower half of the first pipe end and openings in the upper half of the other pipe end, and welding the pipes together through the openings.

2. The method of joining pipes comprising bringing two pipes in horizontal alignment, one pipe end being a male and the other a female, providing openings in the lower half of the male pipe and in the upper half of the female pipe, and permanently connecting the pipes together from the interior of the pipe through an opening in the male and from the exterior of the pipe through an opening in the female.

HENRY A. STRINGFELLOW.